United States Patent
Butin et al.

(10) Patent No.: US 12,225,946 B2
(45) Date of Patent: Feb. 18, 2025

(54) AEROSOL-GENERATING DEVICE AND SYSTEM COMPRISING A DYNAMIC NEAR-FIELD COMMUNICATION MODULE

(71) Applicant: Philip Morris Products S.A., Neuchatel (CH)

(72) Inventors: Yannick Butin, Marin-Epagnier (CH); Raphael Holzherr, Fontainemelon (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 18/002,804

(22) PCT Filed: Jun. 24, 2021

(86) PCT No.: PCT/EP2021/067286
§ 371 (c)(1),
(2) Date: Dec. 21, 2022

(87) PCT Pub. No.: WO2021/230089
PCT Pub. Date: Dec. 30, 2021

(65) Prior Publication Data
US 2023/0240381 A1    Aug. 3, 2023

(30) Foreign Application Priority Data
Jun. 24, 2020    (EP) .................................... 20182038

(51) Int. Cl.
*A24F 40/65*    (2020.01)
*A24F 40/53*    (2020.01)
(Continued)

(52) U.S. Cl.
CPC .............. *A24F 40/65* (2020.01); *A24F 40/53* (2020.01); *A24F 40/90* (2020.01);
(Continued)

(58) Field of Classification Search
CPC .......... A24F 40/65; A24F 40/53; A24F 40/90; G06K 7/10297; H02J 7/0044; H02J 7/0047
See application file for complete search history.

(56) References Cited

U.S. PATENT DOCUMENTS

| | | | |
|---|---|---|---|
| 2017/0266397 A1* | 9/2017 | Mayle | A61M 15/06 |
| 2018/0160733 A1* | 6/2018 | Leadley | A24F 40/50 |

(Continued)

FOREIGN PATENT DOCUMENTS

| | | |
|---|---|---|
| EA | 34538 B1 | 2/2020 |
| EP | 3 666 094 A1 | 6/2020 |

(Continued)

OTHER PUBLICATIONS

International Preliminary Report on Patentability and Written Opinion issued Dec. 13, 2022 in PCT/EP2021/067286, 9 pages.

(Continued)

*Primary Examiner* — Thien M Le
(74) *Attorney, Agent, or Firm* — Oblon, McClelland, Maier & Neustadt, L.L.P.

(57) ABSTRACT

An aerosol-generating device is provided, including: a near-field communication device configured to communicate with an external device, the near-field communication device being configured to store a message including a list of records, the list including a first record associated with a first operation to be executed by the external device and a second record associated with a second operation to be executed by the external device, the first operation being different from the second operation; and a controller configured to monitor a state of the aerosol-generating device, and in response to detecting a predetermined state of the (Continued)

aerosol-generating device, configure the list of records to define an order of the first record and the second record in the list.

10 Claims, 5 Drawing Sheets

(51) Int. Cl.
    *A24F 40/90*         (2020.01)
    *G06K 7/10*          (2006.01)
    *H02J 7/00*          (2006.01)

(52) U.S. Cl.
    CPC ........ *G06K 7/10297* (2013.01); *H02J 7/0044*
            (2013.01); *H02J 7/0047* (2013.01)

(56) References Cited

U.S. PATENT DOCUMENTS

| | | | | |
|---|---|---|---|---|
| 2018/0271155 A1* | 9/2018 | Baker | ..................... | A24F 40/53 |
| 2020/0046030 A1* | 2/2020 | Krietzman | ....... | G06K 19/07758 |
| 2020/0146361 A1 | 5/2020 | Silver et al. | | |
| 2020/0237005 A1* | 7/2020 | Lim | ......................... | A24F 40/60 |
| 2020/0237014 A1* | 7/2020 | Lee | ........................ | A61M 15/06 |
| 2020/0315253 A1* | 10/2020 | Legendy | .................. | A24F 40/42 |
| 2020/0352249 A1* | 11/2020 | Achtien | ............ | A61M 15/0066 |
| 2020/0404974 A1* | 12/2020 | Chen | ..................... | G08B 21/182 |
| 2021/0045452 A1* | 2/2021 | Barbaric | .................. | A24F 40/65 |
| 2021/0161213 A1* | 6/2021 | Woodbine | .............. | G16H 40/67 |
| 2022/0110363 A1* | 4/2022 | Carlson | .................... | A24F 40/48 |
| 2022/0253615 A1* | 8/2022 | Lin | ......................... | A24F 40/65 |
| 2022/0256928 A1* | 8/2022 | Lin | ......................... | A24F 40/60 |

FOREIGN PATENT DOCUMENTS

| | | |
|---|---|---|
| RU | 2680224 C2 | 2/2019 |
| RU | 2680444 C1 | 2/2019 |
| RU | 2702025 C2 | 10/2019 |
| WO | WO 2017/055793 A1 | 4/2017 |

OTHER PUBLICATIONS

International Search Report issued Sep. 22, 2021 in PCT/EP2021/067286, filed on Jun. 24, 2021, citing documents 1- 4 & 15-16 therein, 2 pages.

Russian Office Action issued in corresponding Russian Patent Application No. 2023101244, with machine generated English Translation (11 pgs. total).

Russian Search Report issued in corresponding Russian Patent Application No. 2023101244, with machine generated English Tranlsation (4 pgs. total) (citing documents 15-18 therein).

* cited by examiner

AEROSOL-GENERATING DEVICE AND SYSTEM COMPRISING A DYNAMIC NEAR-FIELD COMMUNICATION MODULE

The present disclosure relates to near-field communication. Specifically, the present disclosure relates to configuration of a near-field communication message to facilitate the automatic execution of operations associated with records in the near-field communication message.

Near-field communication is a method of wireless data transfer over a short range. Data is stored by a near-field communication module or tag as a message comprising a list of records. To read the data stored by the near-field communication module, software installed on a near-field communication enabled device, such as a mobile terminal, causes near-field communication reader circuitry of the mobile terminal to generate a weak magnetic field. When the mobile terminal is brought within a few centimeters of the near-field communication module, the weak magnetic field generated by the near-field communication reader circuitry induces a magnetic field in the near-field communication module. The magnetic field induces electricity in the near-field communication module, creating a radio field. The radio field generated by the near-field communication module is detected and decoded by the mobile terminal. In this manner, the message stored by the near-field communication module is sent to the mobile terminal. The mobile terminal then executes the first record in the message, even though the message includes a list of successive records, arranged in series. Therefore, only the information that is put at the top of the list is automatically processed and the record that needs to be executed automatically is chosen when the data is written to the near-field communication module.

It is desirable to provide a technique that enables operations associated with two or more records stored in a near-field communication message to be automatically executed by the near-field communication enabled device.

According to an aspect of the present invention there is provided a device comprising a near-field communication module for communicating with an external device. The near-field communication module may be configured to store a message comprising a list of records. The list may comprise a first record associated with a first operation to be executed by the external device and a second record associated with a second operation to be executed by the external device. The first operation may be different from the second operation. The device further comprises a control unit configured to monitor a state of the device. In response to detecting a predetermined state of the device, the control unit may configure the list of records to define an order of the first record and the second record in the list. The device may be an aerosol-generating device. The device may be a charging device associated with an aerosol-generating device.

The order of the first record and the second record in the list defines whether the first operation or the second operation is to be automatically executed by the external device.

The first operation is to be automatically executed by the external device when the first record is first in the list and the second operation is to be automatically executed by the external device when the second record is first in the list.

By configuring the list of records to define an order of the first record and the second record in the list in response to detecting a predetermined state of the device, both records in the list can be automatically processed. This enables two different operations to be automatically performed by the external device depending on the state of the device. The predetermined state may be a first state, and the control unit may be configured to configure the list such that the first record is first in the list. Although the device executes the first record in the list, the device is always able to perform the appropriate action for the device status because the list is configured in accordance with the specific detected predetermined state.

The first predetermined state may be an advertising state. For example, the advertising state may be a Bluetooth advertising state or a Bluetooth Low Energy advertising state. The first record may be of a multipurpose internet mail extension media type. For example, the first record may comprise a Bluetooth address or a Bluetooth Low Energy address. The first operation may comprise communicatively coupling the aerosol-generating device and the external device.

The device may further comprise a storage means configured to store information relating to usage of the device that is sent to the external device when the device and the external device are communicatively coupled.

When the predetermined state is a second state, the control unit may be configured to configure the list such that the second record is first in the list. Therefore, although the device executes the first record in the list, the device is always able to perform the appropriate action for the device status because the order of the records in the list is configured in accordance with the specific detected predetermined state.

The second predetermined state may be an off state or a communicatively coupled state. For example, the communicatively coupled state may be a Bluetooth connection state or a Bluetooth Low Energy connection state. The second record may be of a uniform resource identifier type. For example, the second operation may comprise one of opening an internet browser and opening an application. The second record may comprise a uniform resource locator. The second operation may comprise opening an internet browser and navigating to a website associated with the uniform resource locator.

The near-field communication module may be further configured to send the message to the external device. The message may be sent to the external device when a distance between the external device and the near-field communication module is below a threshold distance.

The near-field communication module may be a dynamic near-field communication tag. The stored message may be a near-field communication data exchange format message.

The device may further comprise a communication module for communicating with the external device. For example, the communication module may be one of a Bluetooth module and a Bluetooth Low Energy module.

The control unit may be further configured to receive a registration confirmation message from the external device. In response to receiving the registration confirmation message, the control unit may be further configured to initiate unlocking of the aerosol generating device such that the aerosol-generating device is operable for generating an aerosol.

According to another aspect, a method for configuring communication between a device and an external device may comprise storing, by a near-field communication module, a message comprising a list of records. The list may comprise a first record associated with a first operation to be executed by the external device and a second record associated with a second operation to be executed by the external device. The first operation may be different from the second operation.

The method may further comprise monitoring, by a control unit, a state of the aerosol-generating device. The method may further comprise, in response to detecting a predetermined state of the aerosol-generating device, configuring, by the control unit, the list of records to define an order of the first record and the second record in the list.

The order of the first record and the second record in the list defines whether the first operation or the second operation is to be automatically executed by the external device.

The first operation is to be automatically executed by the external device when the first record is first in the list and the second operation is to be automatically executed by the external device when the second record is first in the list.

By configuring the list of records to define an order of the first record and the second record in the list in response to detecting a predetermined state of the device, both records in the list can be automatically processed. This enables two different operations to be automatically performed by the external device depending on the state of the device. When the predetermined state is a first state, configuring the list of records may comprise configuring the list such that the first record is first in the list.

The first predetermined state may be an advertising state. For example, the advertising state may be a Bluetooth advertising state or a Bluetooth Low Energy advertising state. The first record may be of a multipurpose internet mail extension media type. For example, the first record may comprise a Bluetooth address or a Bluetooth Low Energy address.

The first operation may comprise communicatively coupling the device and the external device.

The method may further comprise storing information relating to usage of the device and sending the information relating to usage of the device to the external device when the device and the external device are communicatively coupled.

When the predetermined state is a second state, configuring the list of records may comprise configuring the list such that the second record is first in the list.

The second predetermined state may be an off state or a communicatively coupled state.

For example, the communicatively coupled state may be a Bluetooth connection state or a Bluetooth Low Energy connection state. The second record may be of a uniform resource identifier type. The second operation may comprise one of opening an internet browser and opening an application. The second record may comprise a uniform resource locator. The second operation may comprise opening an internet browser and navigating to a website associated with the uniform resource locator.

The method may further comprise sending, by the near-field communication module, the message to the external device. Sending the message to the external device may comprise sending the message to the external device when a distance between the external device and the near-field communication module is below a threshold distance.

The near-field communication module may be a dynamic near-field communication tag.

The stored message may be a near-field communication data exchange format message.

The method may further comprise communicating with the external device using one of Bluetooth and Bluetooth Low Energy.

The method may further comprise receiving, by the control unit, a registration confirmation message from the external device. In response to receiving the registration confirmation message, the control unit may initiate unlocking of the aerosol generating device such that the aerosol-generating device is operable for generating an aerosol.

According to an aspect, a computer-readable storage medium has computer-executable instructions stored thereon which, when executed by a processor, perform a method for configuring communication between a device and an external device, which may comprise storing, by a near-field communication module, a message comprising a list of records.

According to an aspect, provided is a use of a near-field communication message stored for an aerosol-generating device to enable a mobile device to automatically execute at least two operations associated with the aerosol-generating device, by configuring an order of records in the near-field communication message based on at least one of a state of the aerosol-generating device or a state of a device associated with the aerosol-generating device, such as a charging device.

As used herein, the term "aerosol-generating device" refers to a device that interacts with an aerosol-forming substrate to generate an aerosol. An aerosol-generating device may interact with one or both of an aerosol-generating article comprising an aerosol-forming substrate, and a cartridge comprising an aerosol-forming substrate. In some examples, the aerosol-generating device may heat the aerosol-forming substrate to facilitate release of volatile compounds from the substrate. An electrically operated aerosol-generating device may comprise an atomizer, such as an electric heater, to heat the aerosol-forming substrate to form an aerosol.

As used herein, the term "aerosol-forming substrate" refers to a substrate capable of releasing volatile compounds that can form an aerosol. The volatile compounds may be released by heating or combusting the aerosol-forming substrate. As an alternative to heating or combustion, in some cases, volatile compounds may be released by a chemical reaction or by a mechanical stimulus, such as ultrasound. The aerosol-forming substrate may be solid or liquid or may comprise both solid and liquid components. An aerosol-forming substrate may be part of an aerosol-generating article.

Preferably, the aerosol-generating device comprises a power supply configured to supply power to the heating element. The power supply preferably comprises a power source. Preferably, the power source is a battery, such as a lithium ion battery. As an alternative, the power source may be another form of charge storage device such as a capacitor. The power source may require recharging. For example, the power source may have sufficient capacity to allow for the continuous generation of aerosol for a period of around six minutes or for a period that is a multiple of six minutes. In another example, the power source may have sufficient capacity to allow for a predetermined number of puffs or discrete activations of the heater assembly.

The power supply may comprise control electronics. The control electronics may comprise a microcontroller. The microcontroller is preferably a programmable microcontroller. The electric circuitry may comprise further electronic components. The electric circuitry may be configured to regulate a supply of power to the heater assembly. Power may be supplied to the heater assembly continuously following activation of the system or may be supplied intermittently, such as on a puff-by-puff basis. The power may be supplied to the heater assembly in the form of pulses of electrical current.

As used herein, the terms "in proximity to", "near to" and "close to", when used to refer to a position of the near-field communication module relative to the external device, mean that a distance between the external device and the near-field communication module is below a threshold distance.

As used herein, the term "communicatively coupled" refers to devices being connected to each other in a wired manner or wirelessly such that the devices may communicate with each other. A specific example of communicatively coupling is pairing.

The invention is defined in the claims. However, below there is provided a non-exhaustive list of non-limiting examples. Any one or more of the features of these examples may be combined with any one or more features of another example, embodiment, or aspect described herein.

Example Ex1: An aerosol-generating device, comprising: a near-field communication module for communicating with an external device, wherein the near-field communication module is configured to store a message comprising a list of records, wherein the list comprises a first record associated with a first operation to be executed by the external device and a second record associated with a second operation to be executed by the external device, and wherein the first operation is different from the second operation; and a control unit configured to: monitor a state of the aerosol-generating device; and in response to detecting a predetermined state of the aerosol-generating device, configure the list of records to define an order of the first record and the second record in the list.

Example Ex2: A charging device for receiving an aerosol-generating device, the charging device comprising: a near-field communication module for communicating with an external device other than the aerosol-generating device, wherein the near-field communication module is configured to store a message comprising a list of records, wherein the list comprises a first record associated with a first operation to be executed by the external device and a second record associated with a second operation to be executed by the external device, and wherein the first operation is different from the second operation; and a control unit configured to: monitor a state of the charging device; and in response to detecting a predetermined state of the charging device, configure the list of records to define an order of the first record and the second record in the list.

Example Ex3: The aerosol-generating device according to example Ex1 or the charging device according to example Ex2, wherein the order of the first record and the second record in the list defines whether the first operation or the second operation is to be automatically executed by the external device.

Example Ex4: The aerosol-generating device or the charging device according to one of the preceding examples, wherein the first operation is to be automatically executed by the external device when the first record is first in the list and the second operation is to be automatically executed by the external device when the second record is first in the list.

Example Ex5: The aerosol-generating device or the charging device according to one of the preceding examples, wherein, when the predetermined state is a first state, the control unit is configured to configure the list such that the first record is first in the list.

Example Ex6: The aerosol-generating device or the charging device according to example Ex5, wherein the first predetermined state is an advertising state.

Example Ex7: The aerosol-generating device or the charging device according to example Ex6, wherein the advertising state is a Bluetooth advertising state or a Bluetooth Low Energy advertising state.

Example Ex8: The aerosol-generating device or the charging device according to any of examples Ex5 to Ex7, wherein the first record is of a multipurpose internet mail extension media type.

Example Ex9: The aerosol-generating device or the charging device according to example Ex8, wherein the first record comprises a Bluetooth address or a Bluetooth Low Energy address.

Example Ex10: The aerosol-generating device according to examples Ex8 or Ex9, wherein the first operation comprises communicatively coupling the aerosol-generating device and the external device.

Example Ex11: The aerosol-generating device according to example Ex10, further comprising storage means configured to store information relating to usage of the aerosol-generating device that is sent to the external device when the aerosol-generating device and the external device are communicatively coupled.

Example Ex12: The charging device according to examples Ex8 or Ex9, wherein the first operation comprises communicatively coupling the charging device and the external device.

Example Ex13: The charging device according to example Ex12, further comprising storage means configured to store information relating to usage of the aerosol-generating device that is sent to the external device when the charging device and the external device are communicatively coupled.

Example Ex14: The aerosol-generating device or the charging device according to any of the preceding examples, wherein, when the predetermined state is a second state, the control unit is configured to configure the list such that the second record is first in the list.

Example Ex15: The aerosol-generating device or the charging device according to example Ex14, wherein the second predetermined state is an off state or a communicatively coupled state.

Example Ex16: The aerosol-generating device or the charging device according to example Ex15, wherein the communicatively coupled state is a Bluetooth connection state or a Bluetooth Low Energy connection state.

Example Ex17: The aerosol-generating device or the charging device according to any of examples Ex14 to Ex16, wherein the second record is of a uniform resource identifier type.

Example Ex18: The aerosol-generating device or the charging device according to example Ex17 wherein the second operation comprises one of opening an internet browser and opening an application.

Example Ex19: The aerosol-generating device or the charging device according to example Ex17, wherein the second record comprises a uniform resource locator.

Example Ex20: The aerosol-generating device or the charging device according to example Ex19, wherein the second operation comprises opening an internet browser and navigating to a website associated with the uniform resource locator.

Example Ex21: The aerosol-generating device or the charging device according to any of the preceding examples, wherein the near-field communication module is further configured to send the message to the external device.

Example Ex22: The aerosol-generating device or the charging device according to example Ex21, wherein the message is sent to the external device when a distance between the external device and the near-field communication module is below a threshold distance.

Example Ex23: The aerosol-generating device or the charging device according to any of the preceding examples, wherein the near-field communication module is a dynamic near-field communication tag.

Example Ex24: The aerosol-generating device or the charging device according to any of the preceding examples, wherein the stored message is a near-field communication data exchange format message.

Example Ex25: The aerosol-generating device or the charging device according to any of the preceding examples, further comprising a communication module for communicating with the external device.

Example Ex26: The aerosol-generating device or the charging device according to example Ex25, wherein the communication module is one of a Bluetooth module and a Bluetooth Low Energy module.

Example Ex27: The aerosol-generating device or the charging device according to any of the preceding examples, wherein the control unit is further configured to receive a registration confirmation message from the external device.

Example Ex28: The aerosol-generating device or the charging device according to example Ex27, wherein, in response to receiving the registration confirmation message, the control unit is further configured to initiate unlocking of the aerosol generating device such that the aerosol-generating device is operable for generating an aerosol.

Example Ex29: A method for configuring communication between an aerosol-generating device and an external device, comprising: storing, by a near-field communication module, a message comprising a list of records, wherein the list comprises a first record associated with a first operation to be executed by the external device and a second record associated with a second operation to be executed by the external device, and wherein the first operation is different from the second operation; monitoring, by a control unit, a state of the aerosol-generating device; and in response to detecting a predetermined state of the aerosol-generating device, configuring, by the control unit, the list of records to define an order of the first record and the second record in the list.

Example Ex30: A method for configuring communication between a charging device associated with an aerosol-generating device and an external device other than the aerosol-generating device, comprising: storing, by a near-field communication module, a message comprising a list of records, wherein the list comprises a first record associated with a first operation to be executed by the external device and a second record associated with a second operation to be executed by the external device, and wherein the first operation is different from the second operation; monitoring, by a control unit, a state of the charging device; and in response to detecting a predetermined state of the charging device, configuring, by the control unit, the list of records to define an order of the first record and the second record in the list.

Example Ex31: The method according to example Ex29 or example Ex30, wherein the order of the first record and the second record in the list defines whether the first operation or the second operation is to be automatically executed by the external device.

Example Ex32: The method according to one of the preceding examples, wherein the first operation is to be automatically executed by the external device when the first record is first in the list and the second operation is to be automatically executed by the external device when the second record is first in the list.

Example Ex33: The method according to one of the preceding examples, wherein, when the predetermined state is a first state, configuring the list of records comprises configuring the list such that the first record is first in the list.

Example Ex34: The method according to example Ex33, wherein the first predetermined state is an advertising state.

Example Ex35: The method according to example Ex34, wherein the advertising state is a Bluetooth advertising state or a Bluetooth Low Energy advertising state.

Example Ex36: The method according to any of examples Ex33 to Ex35, wherein the first record is of a multipurpose internet mail extension media type.

Example Ex37: The method according to example Ex36, wherein the first record comprises a Bluetooth address or a Bluetooth Low Energy address.

Example Ex38: The method according to example Ex36 or Ex37, wherein the first operation comprises communicatively coupling the aerosol-generating device and the external device.

Example Ex39: The method according to example Ex38, further comprising: storing information relating to usage of the aerosol-generating device; and sending the information relating to usage of the aerosol-generating device to the external device when the aerosol-generating device and the external device are communicatively coupled.

Example Ex40: The method according to examples Ex36 or Ex37, wherein the first operation comprises communicatively coupling the charging device and the external device.

Example Ex41: The method according to example Ex40, further comprising: storing information relating to usage of the aerosol-generating device; and sending the information relating to usage of the aerosol-generating device to the external device when the charging device and the external device are communicatively coupled.

Example Ex42: The method according to any of the preceding examples, wherein, when the predetermined state is a second state, configuring the list of records comprises configuring the list such that the second record is first in the list.

Example Ex43: The method according to example Ex42, wherein the second predetermined state is an off state or a communicatively coupled state.

Example Ex44: The method according to example Ex43, wherein the communicatively coupled state is a Bluetooth connection state or a Bluetooth Low Energy connection state.

Example Ex45: The method according to any of examples Ex42 to Ex44, wherein the second record is of a uniform resource identifier type.

Example Ex46: The method according to example Ex45 wherein the second operation comprises one of opening an internet browser and opening an application.

Example Ex47: The method according to example Ex45, wherein the second record comprises a uniform resource locator.

Example Ex48: The method according to example Ex47, wherein the second operation comprises opening an internet browser and navigating to a website associated with the uniform resource locator.

Example Ex49: The method according to any of the preceding examples, further comprising sending, by the near-field communication module, the message to the external device.

Example Ex50: The method according to example Ex49, wherein sending the message to the external device comprises sending the message to the external device when a distance between the external device and the near-field communication module is below a threshold distance.

Example Ex51: The method according to any of the preceding examples, wherein the near-field communication module is a dynamic near-field communication tag.

Example Ex52: The method according to any of the preceding examples, wherein the stored message is a near-field communication data exchange format message.

Example Ex53: The method according to any of the preceding examples, further comprising communicating with the external device using one of Bluetooth and Bluetooth Low Energy.

Example Ex54: The method according to any of the preceding examples, further comprising receiving, by the control unit, a registration confirmation message from the external device.

Example Ex55: The method according to example Ex54, further comprising, in response to receiving the registration confirmation message, initiating, by the control unit, unlocking of the aerosol generating device such that the aerosol-generating device is operable for generating an aerosol.

Example Ex56: A computer-readable storage medium having computer-executable instructions stored thereon which, when executed by a processor, performs the method of one of examples Ex29 to Ex55.

Example Ex57: Use of a near-field communication message stored for an aerosol-generating device to enable a mobile device to automatically execute at least two operations associated with the aerosol-generating device, by configuring an order of records in the near-field communication message based on at least one of a state of the aerosol-generating device or a state of a device associated with the aerosol-generating device, such as a charging device.

Examples will now be further described with reference to the figures in which.

Figure 1:
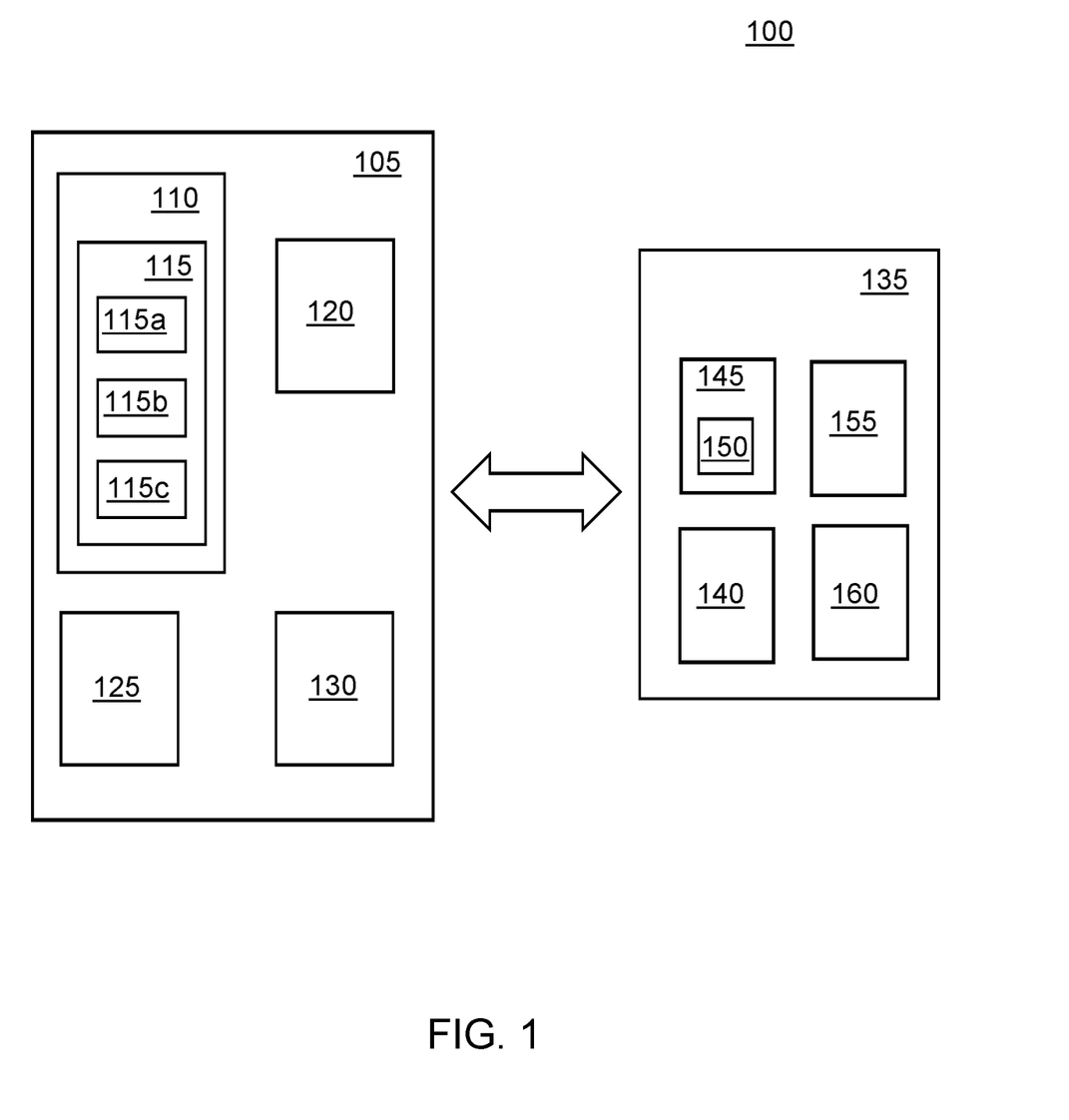
FIG. 1 shows a system comprising a device and an external device.

FIG. 1 illustrates a system 100 comprising a device 105 configured for communication with an external device 135. The device 105 may be an aerosol-generating device, such as the aerosol-generating device 200A illustrated in FIG. 2A or the aerosol-generating device 200B illustrated in FIG. 2B. The device 105 may be a charging device for receiving an aerosol-generating device, such as the charging device 300 illustrated in FIG. 3B. The device 105 comprises a near-field communication module 110, a control unit 120, a storage means 125 and a communication module 130.

The external device 135 may be a mobile terminal. Examples of mobile terminals include mobile phones, smartphones, computers, laptops, tablet computers and personal digital assistants. The external device 135 comprises near-field communication reader circuitry 140 for communicating with the near-field communication module 110 of the device 105, a memory 145 for storing software instructions 150 (for example operating system software and/or application software), one or more processors 155 for executing the software instructions 150 and a communication module 160.

The near-field communication module 110 is configured to transmit a message 115 to the external device 135 when the near-field communication reader circuitry 140 of the external device 135 is activated and the external device 135 is within range of the near-field communication module 110. The near-field communication module 110 comprises near-field communication circuitry for inductively coupling with the near-field communication reader circuitry 140 of the external device 135. The near-field communication module 110 comprises a memory that stores the message 115. The message 115 comprises at least two records arranged in a list. The near-field communication module 110 may be a dynamic near-field communication tag and the message 115 may be a near-field communication data exchange format message.

The message 115 comprises a list of three records: a first record 115a, a second record 115b, and a third record 115c. At least the first record 115a and the second record 115b are each of a different record type. Accordingly, at least the first record 115a and the second record 115b are each associated with a different operation to be executed by the external device 135.

The third record 115c may be of a text type. The third record 115c may comprise an identification number, for example the serial number of the device 105. The identification number may be used, for example, during manufacturing of the device or during other processes requiring the device to be identified.

When the external device 135 is positioned in proximity to the device 105, the near-field communication module 110 sends the message 115 to the external device 135. In other words, the external device 135 receives the message 115 from the near-field communication module 110 when the distance between the external device 135 and the near-field communication module 110 is below a threshold distance.

The order of the records in the list defines which operation will be automatically executed by the software instructions 150 of the external device 135 because the software instructions 150 automatically execute the operation associated with the record that is at the top of the list. In other words, the order of the first record 115a and the second record 115b in the list defines whether an operation associated with the first record 115a or an operation associated with the second record 115b is to be automatically executed by the external device 135.

For example, FIG. 1 shows that the first record 115a is first in the list meaning that the first record 115a is at the top of the list. The second record 115b is second in the list meaning that the second record 115b in the middle of the list. The third record 115c is third in the list meaning that the third record 115c at the bottom of the list. However, it is to be appreciated that the records 115a, 115b and 115c may be arranged in any order. Specifically, as will be explained in more detail below, the order of the records in the list is based at least in part on detection of a predetermined status of the device 105. Accordingly, the operation automatically executed by the external device 135 depends at least in part on the status of the device 105.

Therefore, in response to receiving the message 115, the application and/or operating system software 150 installed on the external device 135 executes the record that is first in the list (in other words, at the top of the list) of records. The external device 135 then performs an operation associated with the executed record. Thus, if the first record 115a is first in the list as illustrated in FIG. 1, the external device 135 automatically executes an operation associated with the first record 115a. The operations associated with the second record 115b and the third record 115c are not executed automatically. If the second record 115b is first in the list, the external device 135 automatically executes an operation associated with the second record 115b. The operations associated with the first record 115a and the third record 115c are not executed automatically.

The near-field communication module 110 is configured such that the content written to and stored by the near-field communication module 110 during manufacturing can be changed during usage of the near-field communication module 110. Accordingly, at a first time, the list of records in the message 115 stored by the near-field communication module 110 may be in a first order. When the list of records is in the first order, a first operation associated with the record that is first in the list will be executed by the external device 135. At a second time, the message 115 stored by the near-field communication module may be overwritten so that the list of records is in a second order. When the list of records is in the second order, a second operation associated with a record that is first in the list and different from the first operation will be executed by the external device 135.

In more detail, the control unit 120 is configured to configure the list of records in the message 115 to define an order of the first record 115a and the second record 115b in the list. The control unit 120 configures the list of records in response to detecting a predetermined state of the device 105. The order of the records in the list is based on the specific predetermined state detected. For example, in response to detecting a first predetermined state of the device 105, the control unit 120 configures the list so that the first record 115a is first in the list, in other words so that the first record 115a is at the top of the list. Then, when the control unit 120 detects a second predetermined state of the device, the control unit 120 configures the list so that the second record 115b is first in the list, in other words so that the second record 115b is at the top of the list. Once the control unit 120 has configured the list of records, the message 115 comprising the configured list of records is stored in the near-field communication module 110, thereby dynamically overwriting the message 115 previously stored in the near-field communication module 110.

The first pre-determined state may be an advertising state. In the advertising state, the device 105 is in a mode such that the external device 135, or any other suitable device, can communicatively couple with the device 105. For example, when the device 105 is in the advertising state, the communication module 130 broadcasts advertising packets that enable the external device 135 to communicatively couple with the device 105 via the communication module 160 of the external device 135. The device 105 enters the advertising state when the communication module 130 is switched on or otherwise activated. The communication modules 130 and 160 may be Bluetooth modules or Bluetooth low energy modules. The advertising state may be a Bluetooth advertising state or a Bluetooth low energy advertising state.

When the control unit 120 detects the advertising state of the device 105, the control unit 120 configures the list so that the first record 115a is at the top of the list. The first record 115a may be of a multipurpose internet mail extension media type. When the first record 115a is of a multipurpose internet mail extension media type, the first record 115a comprises data that enables the external device 135 to communicatively couple with the device 105 when the external device 135 executes the first record 115a. For example, the first record 115a may comprise a Bluetooth address or a Bluetooth low energy address.

Thus, when a distance between the external device 135 and the near-field communication module 110 is below a threshold distance, the near-field communication module 110 sends the message 115 to the external device 135. Because the message is configured such that the first record 115a is first in the list of records, the external device 135 executes the first record 115a and communicatively couples (pairs) with the device 105.

The second predetermined state may be a communicatively coupled state, meaning that the device 105 and the external device 135 are communicatively coupled to each other via their respective communication modules 130 and 160. For example, when the device 105 automatically pairs with the external device 135, the device 105 leaves the advertising state and enters the communicatively coupled state. The communicatively coupled state may be a Bluetooth connection state or a Bluetooth low energy connection state.

Alternatively or additionally, the second predetermined state may be an off state, meaning that the communication module 130 is switched off or not activated.

When the control unit 120 detects the communicatively coupled state or the off state of the device 105, the control unit 120 configures the list of records so that the second record 115b is at the top of the list. The second record 115b may be of a uniform resource identifier type. The second record 115b may comprise data that enables the external device 135 to open an application or to open an internet browser and navigate to a website. For example, the second record 115b may comprise a uniform resource locator.

Therefore, when the distance between the external device 135 and the near-field communication module 110 is below a threshold distance, the near-field communication module 110 sends the message 115 to the external device 135. Because the message 115 is configured such that second record 115b is first in the list of records, the operating system software and/or application software 150 installed on the external device 135 executes the second record 115b. As a result of executing the second record 115b, the software 150 causes an internet browser to automatically open and navigate to a website associated with the uniform resource locator included in the second record 115b. Alternatively or additionally, as a result of executing the second record 115b, another application software may be launched.

The website or application launched in response to executing the second record 115b may enable a user to register the device 105. For example, the uniform resource locator included in the second record 115b may comprise a link to an account associated with the device 105. Once the device 105 is registered, the external device 135 may send a registration confirmation message to the device 105. In response to receiving the registration confirmation message, the control unit 120 is configured to initiate unlocking of the device 105 such that the device 105 is operable by a user. For example, when the device 105 is shipped after manufacturing, the device 105 may be in a locked state meaning that it cannot be operated by a user. After the device 105 receives the registration confirmation message, the control unit 120 configures the device 105 so that it can be operated by a user. In other words, the control unit unlocks the device 105 and the device 105 is now in an unlocked state.

The device 105 further comprises a storage means 125. The storage means is configured to store data associated with the device and the user of the device. The device 105 sends the data to the external device 135 when the device 105 and the external device are communicatively coupled. For example, when the control unit 120 detects that the device 105 is in a communicatively coupled state, the control unit 120 causes the data stored in the storage means 125 to be sent to the external device 135 via the communication module 130. The data may be sent to the external device 135 either periodically when the device 105 is in the communicatively coupled state or when the communicatively coupled state is first detected by the control unit 120.

The storage means 125 may store the received registration confirmation message. After, the initial registration, the registration confirmation message may be used as login credentials for the website or application. Alternatively or in addition, the storage means may store information relating to usage of the device.

Information relating to usage of the device 105 may comprise information about the number of times that the device is used, how long the device is used for each time the device is used, the time of day that the device is used, battery level of the device, and so on. The information relating to usage of the device 105 may be sent to the external device 135 for further processing. For example, the external device 135 may display the received information or data computed based on the received information to the user via an application.

Figure 2A:
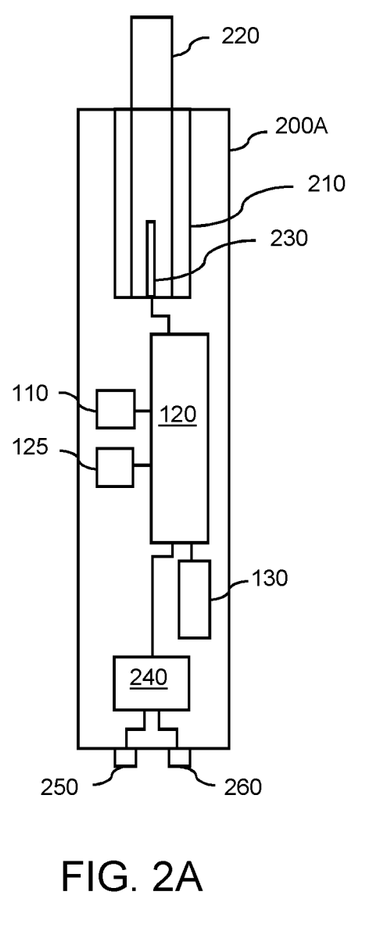
FIG. 2A shows an aerosol-generating device configured for communication with an external device.
Figure 2B:
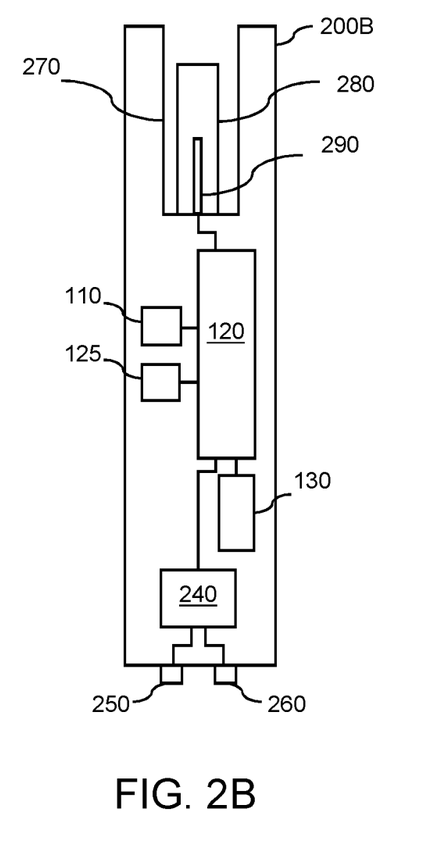
FIG. 2B shows an aerosol-generating device configured for communication with an external device.

As discussed above, the device 105 may be an aerosol-generating device, such as the aerosol-generating device 200A illustrated in FIG. 2A or the aerosol-generating device 200B illustrated in FIG. 2B. The device 105 may be a charging device, such as the charging device 300 illustrated in FIG. 3.

Aerosol-generating device 200A, aerosol-generating device 200B and charging device 300 each comprise the near-field communication module 110, the control unit 120, the storage means 125 and the communication module 130 discussed above in relation to FIG. 1.

The aerosol-generating device 200A is configured to receive an aerosol-generating article 220. Specifically, the aerosol-generating device 200A comprises a cavity 210 for receiving the aerosol-generating article 220. The aerosol-generating article 220 may comprise an aerosol forming substrate. The aerosol-forming substrate of the aerosol-generating article 220 may be a solid, such as a tobacco stick. The aerosol-generating device 200A further comprises a heating element 230. The heating element 230 is configured to heat the aerosol forming substrate to form an aerosol.

Aerosol-generating device 200B is configured to receive a cartridge 280. In particular, the aerosol-generating device 200B comprises a cavity 270 for receiving the cartridge 280. The cartridge 280 may comprise an aerosol-forming substrate. The aerosol-forming substrate of the cartridge 280 may be a liquid. The aerosol-generating device 200B further comprises a heating element 290. The heating element 290 is configured to heat the aerosol forming substrate to form an aerosol.

Preferably, the aerosol-generating device 200A and the aerosol-generating device 200B each comprise a power supply configured to supply power to the respective heating elements 230 and 290. The power supply preferably comprises a power source 240. Preferably, the power source 240 is a battery, such as a lithium ion battery. As an alternative, the power source 240 may be another form of charge storage device such as a capacitor. The power source 240 may require recharging. For example, the power source 240 may have sufficient capacity to allow for the continuous generation of aerosol for a period of around six minutes or for a period that is a multiple of six minutes. In another example, the power source 240 may have sufficient capacity to allow for a predetermined number of puffs or discrete activations of the heater assembly. The aerosol-generating device 200A and the aerosol-generating device 200B may each comprise a power contact 250 for recharging the power supply 240.

The power supply may comprise control electronics. The control electronics may comprise a microcontroller. The microcontroller is preferably a programmable microcontroller. The electric circuitry may comprise further electronic components. The electric circuitry may be configured to regulate a supply of power to the heater assembly. Power may be supplied to the heater assembly continuously following activation of the system or may be supplied intermittently, such as on a puff-by-puff basis. The power may be supplied to the heater assembly in the form of pulses of electrical current.

Figure 3:
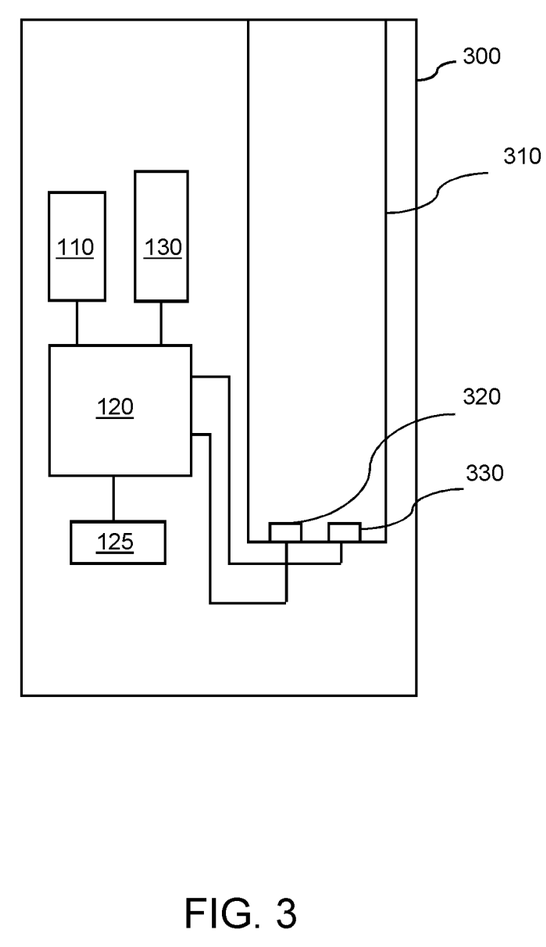
FIG. 3 shows a charging device configured for communication with an external device.

The power source 240 may be recharged using a charging device, such as the charging device 300 illustrated in FIG. 3. The charging device 300 comprises a cavity 310 that is configured to receive an aerosol-generating device, such as aerosol-generating device 200A and aerosol-generating device 200B. Within the cavity 310 there may be a power contact 320 configured to contact with a corresponding power contact 250 of the aerosol-generating device. Specifically, when the aerosol-generating device 200A or the aerosol-generating device 200B is received within the cavity 310, the power contact 250 contacts with power contact 320 so that the charging device 300 can charge the rechargeable power source 240 of the aerosol-generating device 200A or the aerosol-generating device 200B.

In addition, the charging device 300 and the aerosol-generating device 200A or 200B may be configured to exchange data with each other. For example, the charging device 300 and the aerosol-generating device 200A or 200B may be configured to exchange data with each other wirelessly. For example, the charging device 300 and the aerosol-generating device 200A or 200B may exchange data via their respective communication modules 160.

Additionally or alternatively, the charging device 300 may comprise a data contact interface 330 for communicating with the aerosol-generating device 200A and the aerosol-generating device 200B. Referring back to FIGS. 2A and 2B, the aerosol-generating device 200A and the aerosol-generating device 200B are illustrated as comprising data contact interface 260. When the aerosol-generating device 200A or the aerosol-generating device 200B is received within the cavity 310, the data contact interface 330 contacts with the data contact interface 260 and data may be exchanged. For example, the aerosol-generating device 200A or 200B may communicate data, such as the usage data, to the charging device 300 via the data contact interfaces 260 and 330.

Figure 4:
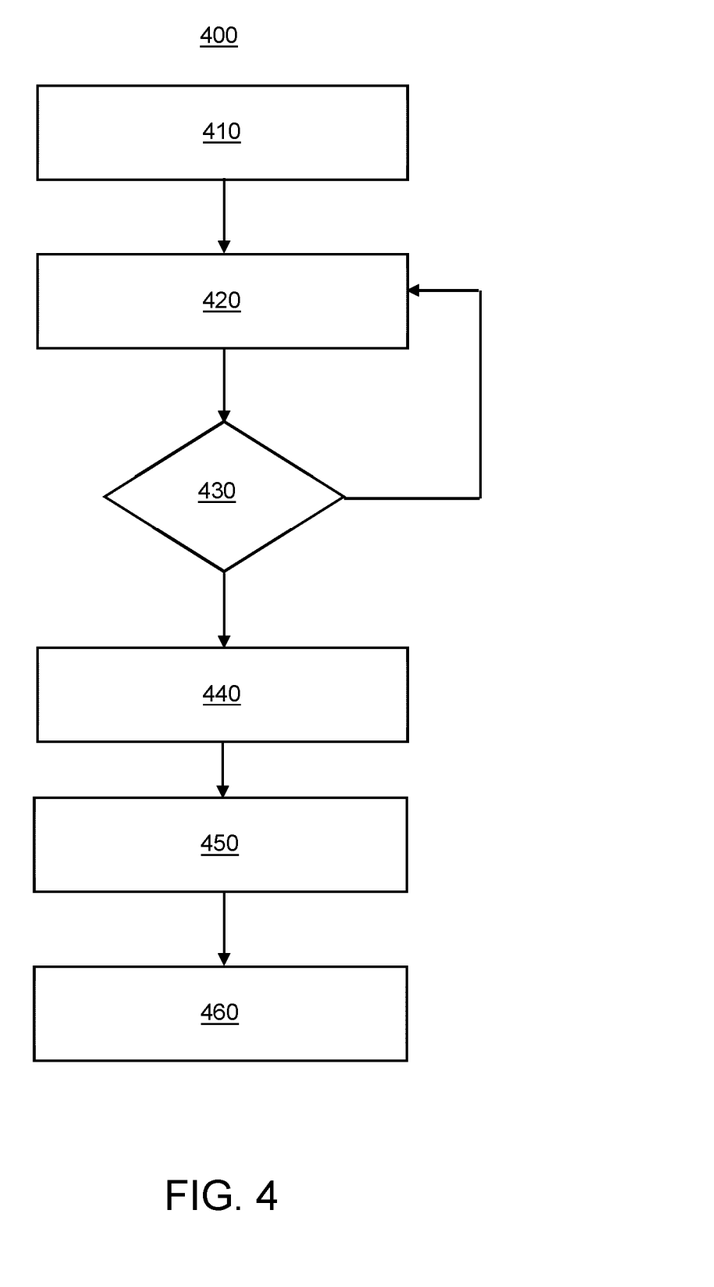
FIG. 4 shows a method for configuring communication between a device and an external device.

FIG. 4 illustrates a method 400 for configuring communication between the device 105 and the external device 135. As discussed above in relation to FIGS. 1 to 3, the device 105 may be an aerosol-generating device 200A or 200B or the device 105 may be a charging device 300 associated with an aerosol-generating device.

The method 400 starts at step 410 in which the near-field communication module 110 stores the message 115 comprising the list of records.

At step 420, the control unit 140 monitors a state of the device 105. At step 430, the control unit 120 determines whether a predetermined state of the device 105 has been detected. If the control unit 120 determines that a predetermined state of the device 105 has not been detected, method 400 returns to step 420 and the control unit 120 continues monitoring the state of the device 105. If, at step 430, the control unit 120 determines that a predetermined state of the device 105 has been detected, method 400 continues to step 440.

As discussed above, the predetermined state may be an advertising state in which the communication module 130 broadcasts advertising packets that enable the external device 135 to communicatively couple with the communication module 160 of the device 105. The predetermined state may be an off state, where the communication module 130 is switched off or not operating. The predetermined state may be a communicatively coupled state, meaning that the device 105 and the external device 135 are communicatively coupled to each other.

At step 440, the control unit 120 configures the list of records to define an order of the first record 115*a* and the second record 115*b* in the list.

The order of the first record and the second record in the list depends on which predetermined state has been detected. For example, if a first predetermined state is detected by the control unit 120, the control unit 120 configures the list of records such that the first record 115*a* is the first in the list. However, if another predetermined state is detected by the control unit 120, the control unit 120 configures the list of records such that the second record 115*b* is the first in the list. The order of the records in the list defines which operation will be automatically executed by the of the external device 135 because the software instructions 150 of the external device 135 automatically execute the operation associated with the record that is at the top of (first in) the list. In other words, the order of the first record 115*a* and the second record 115*b* in the list defines whether an operation associated with the first record 115*a* or an operation associated with the second record 115*b* is to be automatically executed by the external device 135. The operation associated with a record that is not first in the list is not automatically executed the external device 135. Accordingly, because the order of the first record and the second record in the list depends on which predetermined state has been detected, the operation automatically executed by the external device 135 depends on the status of the device 105.

At step 450, the near-field communication module 110 stores the message 115 comprising the list of records configured at step 440.

Finally, at step 460, the near-field communication module 110 sends the message 115 comprising the configured list of records to the external device 135 when the external device 135 is positioned at a distance from the near-field communication module 110 that is less than a threshold distance. Returning to step 420, the control unit 120 then continues to monitor the state of the device 105.

Figure 5:
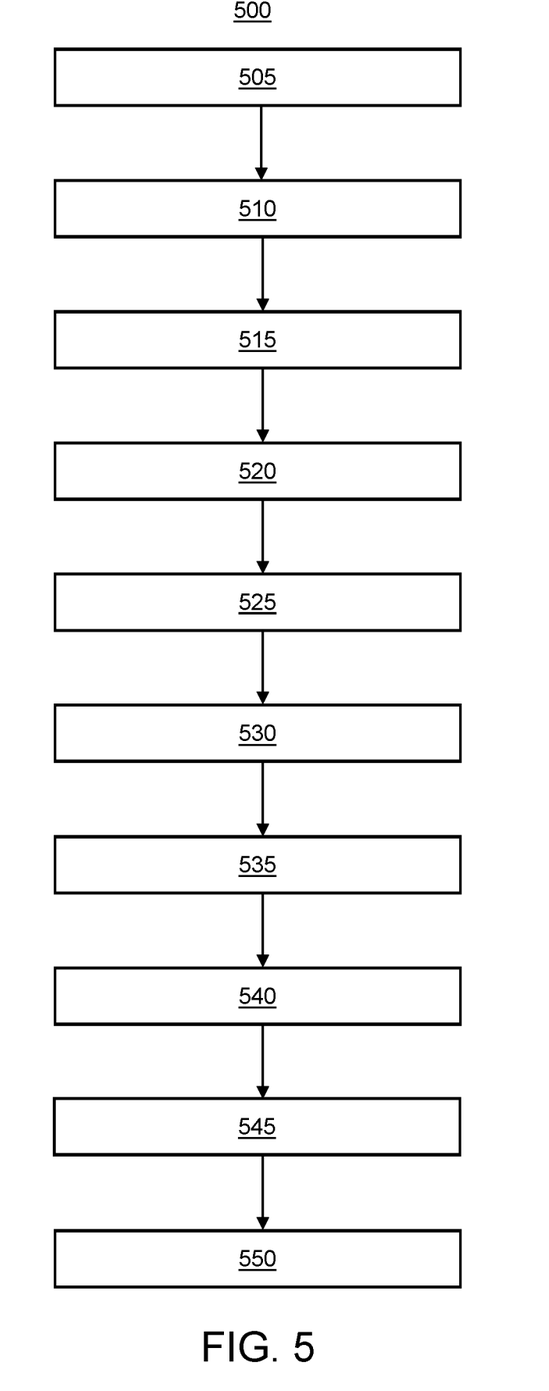
FIG. 5 shows a method for configuring communication between a device and an external device.

FIG. 5 illustrates a method 500 for configuring communication between the device 105 and the external device 135. Method 500 starts at step 505 in which the communication module 130 of device 105 is activated. For example, activation of the communication module 130 may comprise turning on the communication module 130. Once the communication module 130 is activated, the communication module 130 advertises its presence at step 510 by broadcasting advertising packets that enable the external device 135 to communicatively couple with the device 105. The device 105 is now in an advertising state. The advertising state may be a Bluetooth advertising state or a Bluetooth low energy advertising state.

As described above with respect to FIGS. 1 and 4, for example in relation to step 420, the control unit 120 monitors the state of the device 105. When the control unit 120 detects that the device 105 is in the advertising state, which is a predetermined state of the device 105, the control unit 120 configures the list of records in the message 115 stored by the near-field communication module 110 (see for example step 430). As described above, for example in relation to step 440, the control unit 120 configures the list of records to define an order of the first record 115*a* and the second record 115*b* in the list, where the order depends on the predetermined state.

The first record 115*a* may be of a multipurpose internet mail extension media type and may comprise information that enables the external device 135 to communicatively couple to the device 105. The second record 115*b* is of a different type. For example, the second record 115*b* may be of a uniform resource identifier type. Therefore, because the control unit 120 has detected that the device 105 is in an advertising state, the control unit 120, at step 520, configures the message 115 so that the first record 115*a* is at the top of the list of records. The configured message is then stored by the near-field communication module 110 at step 515 (described more generally above as step 450).

When the near-field communication reader circuitry of the external device 135 is brought in proximity to the near-field communication module 110, meaning that the external device is located at a distance from the near-field communication module 110 that is less than a predetermined distance, the near-field communication module 110 sends the message 115 to the external device 135 (step 525 described more generally above as step 460). In response to receiving the message 115 by the external device 135, the software 150 installed on the external device 135 executes the first record in the list, which is the first record 115*a*. As a result of executing the first record 115*a*, the external device 135 automatically communicatively couples (pairs) with the communication module 130 of the device 105 at step 550.

Because the external device 135 and the communication module 130 are communicatively coupled, the device 105 is now in a communicatively coupled state, which is a predetermined state of the device. The control unit 120 therefore detects the communicatively coupled state at step 535 (described more generally above as step 430). In response to detecting the communicatively coupled state, the control unit 120 configures the list of records in the message 115 to define an order of the first record 115*a* and the second record 115*b* in the list (step 540 described more generally above as step 440). The order depends on the detected predetermined state. Therefore, because the predetermined state is a communicatively coupled state and the second record 115*b* may be of a uniform resource identifier type, the control unit 120 configures the list of records so that the second record 115*b* is at the top of the list.

The message 115 comprising the configured list of records is then stored by the near-field communication module 110 at step 545 (described more generally above as step 450).

When the near-field communication reader circuitry 140 of the external device 135 is brought in proximity to the near-field communication module 110, the near-field communication module 110 sends the message 115 to the external device 135 (step 550 described more generally above as step 460). In response to receiving the message 115 by the external device 135, the application and/or operating system software 150 installed on the external device 135 executes the first record in the list, which is the second record 115*b*. The second record 115*b* may comprise data that enables the external device 135 to open an application or to open an internet browser and navigate to a website. For example, the second record 115*b* may comprise a uniform resource locator. Therefore, as a result of executing the second record 115b, the external device 135 automatically opens another software application installed on the external device or automatically opens an internet browser.

Some or all of the method steps describes above with regard to FIGS. 4 and 5 may be implemented by a computer in that they are executed by (or using) a processor, a microprocessor, an electronic circuit or processing circuitry. For example, the implementation can be performed using a non-transitory storage medium such as a computer-readable storage medium. Such computer-readable media can be any available media that can be accessed by a general-purpose or special-purpose computer system.

Generally, examples described herein can be implemented as a computer program product with a program code or computer-executable instructions, the program code or computer-executable instructions being operative for performing one of the methods when the computer program product runs on a computer. The program code or the computer-executable instructions may, for example, be stored on a computer-readable storage medium.

In an example, a storage medium (or a data carrier, or a computer-readable medium) comprises, stored thereon, the computer program or the computer-executable instructions for performing one of the methods described herein when it is performed by a processor. In a further example, an apparatus comprises one or more processors and the storage medium mentioned above.

In a further example, an apparatus comprises means, for example processing circuitry like e.g. a processor communicating with a memory, the means being configured to, or adapted to, perform one of the methods described herein.

A further example comprises a computer having installed thereon the computer program or instructions for performing one of the methods described herein.

The specific e illustrate but do not limit the invention. It is to be understood that other embodiments of the invention may be made and the specific embodiments and examples described herein are not exhaustive.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein.

The invention claimed is:

1. An aerosol-generating device, comprising:
a near-field communication module for communicating with an external device, wherein the near-field communication module is configured to store a message comprising a list of records, wherein the list comprises a first record associated with a first operation to be executed by the external device and a second record associated with a second operation to be executed by the external device, and wherein the first operation is different from the second operation; and
a control unit configured to:
monitor a state of the aerosol-generating device, and
in response to detecting a predetermined state of the aerosol-generating device, configure the list of records to define an order of the first record and the second record in the list,
wherein, when the predetermined state is a second state, the control unit is further configured to configure the list such that the second record is first in the list.

2. The aerosol-generating device according to claim 1, wherein the order of the first record and the second record in the list defines whether the first operation or the second operation is to be automatically executed by the external device.

3. The aerosol-generating device according to claim 1, wherein, when the predetermined state is a first state, the control unit is further configured to configure the list such that the first record is first in the list.

4. The aerosol-generating device according to claim 3,
wherein the first predetermined state is an advertising state, and
wherein the first record is of a multipurpose internet mail extension media type.

5. The aerosol-generating device according to claim 1,
wherein the second predetermined state is an off state or a communicatively coupled state, and
wherein the second record is of a uniform resource identifier type.

6. A charging device configured to receive an aerosol-generating device, the charging device comprising:
a near-field communication module for communicating with an external device other than the aerosol-generating device, wherein the near-field communication module is configured to store a message comprising a list of records, wherein the list comprises a first record associated with a first operation to be executed by the external device and a second record associated with a second operation to be executed by the external device, and wherein the first operation is different from the second operation; and
a control unit configured to:
monitor a state of the charging device, and
in response to detecting a predetermined state of the charging device, configure the list of records to define an order of the first record and the second record in the list,
wherein, when the predetermined state is a second state, the control unit is further configured to configure the list such that the second record is first in the list.

7. The charging device according to claim 6, wherein the order of the first record and the second record in the list defines whether the first operation or the second operation is to be automatically executed by the external device.

8. The charging device according to claim 6, wherein, when the predetermined state is a first state, the control unit is further configured to configure the list such that the first record is first in the list.

9. The charging device according to claim 8,
wherein the first predetermined state is an advertising state, and
wherein the first record is of a multipurpose internet mail extension media type.

10. The charging device according to claim 6,
wherein the second predetermined state is an off state or a communicatively coupled state, and
wherein the second record is of a uniform resource identifier type.

* * * * *

UNITED STATES PATENT AND TRADEMARK OFFICE
CERTIFICATE OF CORRECTION

| | | |
|---|---|---|
| PATENT NO. | : 12,225,946 B2 | Page 1 of 1 |
| APPLICATION NO. | : 18/002804 | |
| DATED | : February 18, 2025 | |
| INVENTOR(S) | : Yannick Butin et al. | |

It is certified that error appears in the above-identified patent and that said Letters Patent is hereby corrected as shown below:

On the Title Page

Item (87), the PCT publication information is incorrect. Item (87) should read:
- (87) PCT Pub. No.: WO2021/260089
PCT Pub. Date: Dec. 30, 2021 -

Signed and Sealed this
Twenty-ninth Day of April, 2025

Coke Morgan Stewart
*Acting Director of the United States Patent and Trademark Office*